(12) United States Patent
Crego et al.

(10) Patent No.: US 12,320,764 B2
(45) Date of Patent: Jun. 3, 2025

(54) SYSTEM AND METHODS OF CHARGED PARTICLE DETECTORS FOR BLAST FURNACE IMAGING

(71) Applicant: Decision Sciences International Corporation, Poway, CA (US)

(72) Inventors: Anthony Crego, Chantilly, CA (US); Sean Simon, Vista, CA (US)

(73) Assignee: DECISION SCIENCES INTERNATIONAL CORPORATION, Poway, CA (US)

( * ) Notice: Subject to any disclaimer, the term of this patent is extended or adjusted under 35 U.S.C. 154(b) by 215 days.

(21) Appl. No.: 17/834,496

(22) Filed: Jun. 7, 2022

(65) Prior Publication Data

US 2022/0397539 A1    Dec. 15, 2022

Related U.S. Application Data

(60) Provisional application No. 63/208,899, filed on Jun. 9, 2021.

(51) Int. Cl.
*G01N 23/225*    (2018.01)
*G01N 23/2202*    (2018.01)

(52) U.S. Cl.
CPC ....... *G01N 23/225* (2013.01); *G01N 23/2202* (2013.01)

(58) Field of Classification Search
CPC ................ G01N 23/225; G01N 23/00; G01N 2223/205; G01N 2223/631; G01N 23/04; G01N 23/2202; C21B 7/24
See application file for complete search history.

(56) References Cited

U.S. PATENT DOCUMENTS 3,100,841 A     8/1963   Reider
3,767,915 A  *  10/1973  Battist ...................... G01T 7/02
                                                    250/366

(Continued)

FOREIGN PATENT DOCUMENTS

JP      H08261741 A      10/1996
JP     2009072361 A   *  9/2007
(Continued)

OTHER PUBLICATIONS

International Search Report and Written Opinion mailed Aug. 25, 2022 in International Patent Application No. PCT/US22/32853, 10 pages.

(Continued)

*Primary Examiner* — Dani Fox
*Assistant Examiner* — Miya Downing
(74) *Attorney, Agent, or Firm* — Perkins Coie LLP (57) ABSTRACT

Imaging technology using high energy charged particles can be used to image an object of inspection such as a blast furnace. An example method of imaging a blast furnace includes performing a first moving operation by moving a first particle tracking detector and a second particle tracking detector up or down movement along a height of the blast furnace; performing a second moving operation by moving the first particle tracking detector and the second particle tracking detector clockwise or counterclockwise movement around the blast furnace; and receiving, by the first particle tracking detector, incoming charged particles; receiving, by the second particle tracking detector, outgoing charged particles transiting through the blast furnace; and producing an image of a volume of interest located in between the first particle tracking detector and the second particle tracking detector by processing electrical signals corresponding to the received incoming and outgoing charged particles.

20 Claims, 8 Drawing Sheets

(56) References Cited

U.S. PATENT DOCUMENTS

| | | | |
|---|---|---|---|
| 9,423,361 B2 * | 8/2016 | Sugita | G01N 23/04 |
| 10,115,199 B2 | 10/2018 | Patnaik | |
| 10,872,746 B2 | 12/2020 | Borozdin | |
| 2003/0000343 A1 | 1/2003 | Contrucci et al. | |
| 2006/0108721 A1 | 5/2006 | Weaver | |
| 2007/0138390 A1 | 6/2007 | Nishiyama et al. | |
| 2011/0248163 A1 | 10/2011 | Morris et al. | |
| 2015/0287237 A1 * | 10/2015 | Bai | G06T 15/08 |

FOREIGN PATENT DOCUMENTS

| | | | |
|---|---|---|---|
| JP | 2008145141 A | 6/2008 | |
| JP | 2013217811 A | 10/2013 | |
| JP | 2019012000 A | 1/2019 | |
| WO | 2020093067 A1 | 5/2020 | |

OTHER PUBLICATIONS

Extended European Search Report mailed Feb. 24, 2025 in European Patent Application No. 22821035.7, 9 pages.
First Examination Report mailed Apr. 8, 2025 in Australian Patent Application No. 2022289487, 4 pages.
Office Action mailed Apr. 15, 2025 in Japanese Patent Application No. 2023-575866, 5 pages, English Translation.

* cited by examiner

Detector configurations

Performing a first moving operation by moving a first particle tracking detector and a second particle tracking detector up or down movement along a height of the blast furnace

802

Performing a second moving operation by moving the first particle tracking detector and the second particle tracking detector clockwise or counterclockwise movement around the blast furnace

804

Receiving, by the first particle tracking detector, incoming charged particles

806

Receiving, by the second particle tracking detector, outgoing charged particles transiting through the blast furnace

808

Producing an image of a volume of interest located in between the first particle tracking detector and the second particle tracking detector by processing electrical signals corresponding to the received incoming and outgoing charged particles

SYSTEM AND METHODS OF CHARGED PARTICLE DETECTORS FOR BLAST FURNACE IMAGING

CROSS-REFERENCE TO RELATED APPLICATIONS

This application claims priority to U.S. Provisional Patent Application No. 63/208,899, filed on Jun. 9, 2021, the entire content of which is incorporated herein by reference.

TECHNICAL FIELD

This patent document relates to the field of imaging and inspecting various items with charged particle detectors.

BACKGROUND

Figure 1:
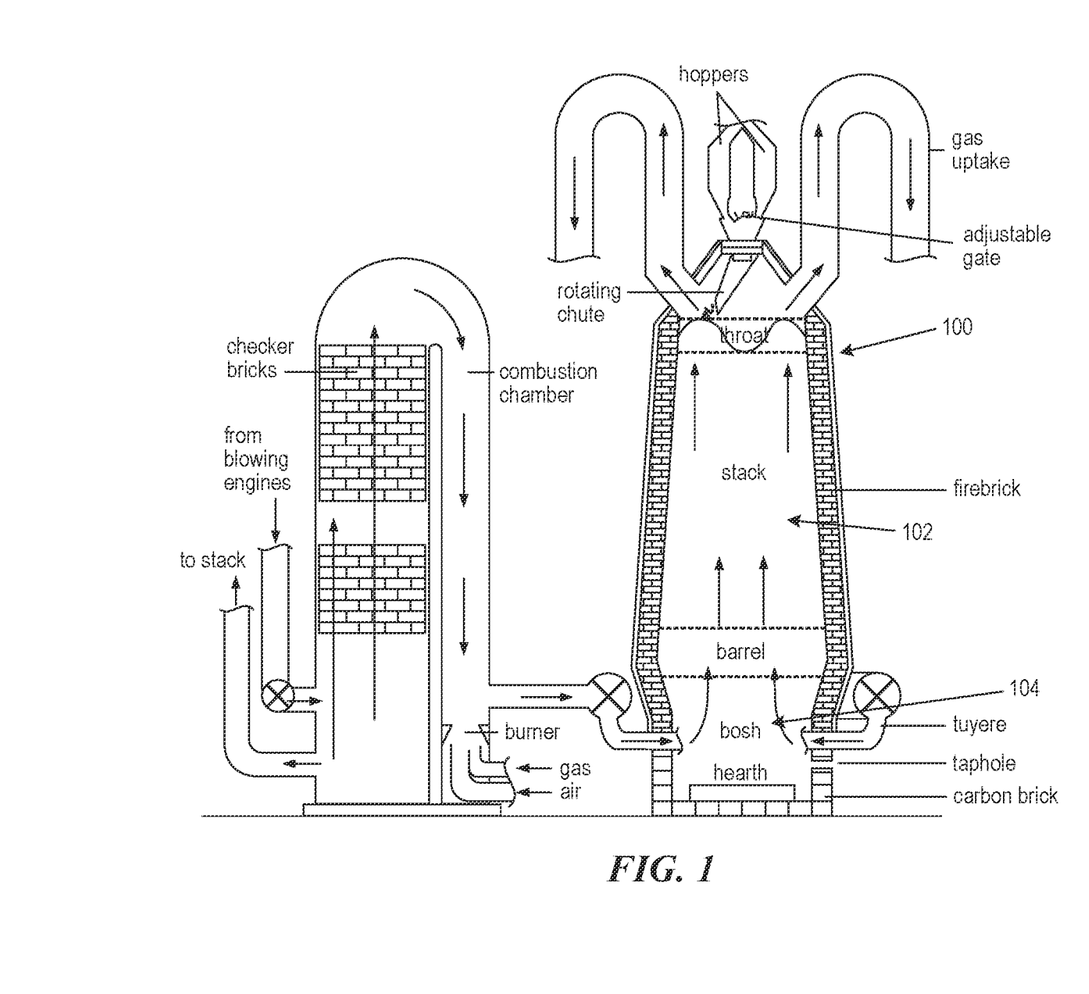
FIG. 1 shows an example of blast furnace as an object of inspection.

FIG. 1 shows an example of a blast furnace 100 that can include a vertical shaft furnace that can produce liquid metals by the reaction of a flow of air introduced under pressure into the bottom of the furnace with a mixture of metallic ore, coke, and flux fed into the top. Blast furnaces can be used to produce pig iron from iron ore for subsequent processing into steel, and they can also be employed in processing lead, copper, and other metals. In a blast furnace, rapid combustion can be maintained by the current of air under pressure.

A furnace charge, or burden, of iron-bearing materials (e.g., iron-ore pellets and sinter), coke, and flux (e.g., limestone) can descend through the shaft 102, where it is preheated and reacts with ascending reducing gases to produce liquid iron and slag that accumulate in the hearth 104. Air that has been preheated to temperatures from approximately 900° to 1,250° C. (approximately 1,650° and 2,300° F.), together with injected fuel such as oil or natural gas, can be blown into the furnace through multiple tuyeres (also known as nozzles) located around the circumference of the furnace near the top of the hearth 104. These nozzles may number from 12 to as many as 40 on large furnaces. The preheated air is, in turn, supplied from a bustle pipe, a large-diameter pipe encircling the furnace. The preheated air reacts vigorously with the preheated coke, resulting in both the formation of the reducing gas, such as carbon monoxide, that rises through the furnace, and a very high temperature of about 1,650° C. (about 3,000° F.) that produces the liquid iron and slag.

Referring to FIG. 1, the bosh is the hottest part of the furnace because of its close proximity to the reaction between air and coke. Molten iron accumulates in the hearth 104, which has a taphole to draw off the molten iron and, higher up, a slag hole to remove the mixture of impurities and flux. The hearth 104 and bosh are thick-walled structures that can be lined with carbon-type refractory blocks, while the stack can be lined with high-quality fireclay brick (also known as firebrick) to protect the furnace shell. To keep these refractory materials from burning out, plates, staves, or sprays for circulating cool water can be built into them.

The stack is kept full of alternating layers of coke, ore, and limestone admitted at the top during continuous operation. Coke is ignited at the bottom and burned rapidly with the forced air from the tuyeres. The iron oxides in the ore are chemically reduced to molten iron by carbon and carbon monoxide from the coke. The slag formed consists of the limestone flux, ash from the coke, and substances formed by the reaction of impurities in the ore with the flux. It floats in a molten state on the top of the molten iron. Hot gases rise from the combustion zone, heating fresh material in the stack and then passing out through ducts near the top of the furnace.

SUMMARY

This patent document discloses apparatuses, systems, and methods to inspect a volume of interest in an equipment, such as a volume of interest in a blast furnace. The disclosed technology can overcome at least some of the drawbacks of current technology to monitor the blast furnace by using a plurality of detectors located next to the blast furnace to measure naturally occurring charged particles, such as muons and electrons, passing through the blast furnace so that an image of the inner structure in the blast furnace and/or the outer structure of the blast furnace can be obtained. The technology presented in this patent document can measure multiple coulomb scattering angles and attenuation of charged particles traversing the volume of interest and/or measure scattering angles and attenuation of charged particles traversing the volume of interest so that materials and densities of the volume of interest (e.g., in the blast furnace) can be determined and/or the health of the blast furnace can be determined.

An example method of imaging a blast furnace comprises performing a first moving operation by moving a first particle tracking detector and a second particle tracking detector up or down movement along a height of the blast furnace, wherein a location of the first particle tracking detector next to a side of the blast furnace is higher than that of the second particle tracking detector; performing a second moving operation by moving the first particle tracking detector and the second particle tracking detector clockwise or counterclockwise movement around the blast furnace; and after the first moving operation and after the second moving operation is performed: receiving, by the first particle tracking detector, incoming charged particles; receiving, by the second particle tracking detector, outgoing charged particles transiting through the blast furnace; and producing an image of a volume of interest located in between the first particle tracking detector and the second particle tracking detector by processing electrical signals corresponding to the received incoming and outgoing charged particles.

In some embodiments, the method comprises performing the up or down movement of the first particle tracking detector and the second particle tracking detector at a same time or in unison; and performing the up or down movement of the first particle tracking detector and the second particle tracking detector while keeping a position of the first particle tracking detector relative to that of the second particle tracking detector the same.

In some embodiments, a particle measurement apparatus comprises a first particle tracking detector located adjacent to a blast furnace to receive incoming charged particles, the first particle tracking detector configured to measure position and direction of the incoming charged particles received thereon; and a second particle tracking detector located adjacent to the blast furnace to receive outgoing charged particles after transiting through the blast furnace and to measure position and direction of the outgoing charged particles received thereon; where the first particle tracking detector and the second particle tracking detector are movably coupled to a mechanical support structure, where the first particle tracking detector and the second particle tracking detector are movable up or down along a height of the blast furnace, where the first particle tracking detector and the second particle tracking detector are movable clockwise or counterclockwise around the blast furnace, where a location of the first particle tracking detector next to a side of the blast furnace is higher than that of the second particle tracking detector, and where the first particle tracking detector and the second particle tracking detector are respectively configured to produce electrical signals corresponding to the received incoming and outgoing charged particles, and wherein the electrical signals, when received by and processed by a processor, enable construction of an image of a volume of interest located in between the first particle tracking detector and the second particle tracking detector.

In some embodiments, the first particle tracking detector and the second particle tracking detector respectively include a first side and a second side that faces the blast furnace, and a surface area of the first side or the second side is selected based on a distance between an outer perimeter of the blast furnace and the first particle tracking detector or the second particle tracking detector. In some embodiments, the first particle tracking detector and the second particle tracking detector are movable up or down along the height of the blast furnace at a same time or in unison. In some embodiments, the first particle tracking detector and the second particle tracking detector are movable up or down along the height of the blast furnace while a position of the first particle tracking detector relative to that of the second particle tracking detector is kept the same. In some embodiments, a first mobile assembly comprising the first particle tracking detector and a third particle tracking detector are located adjacent to the blast furnace, and wherein a gap separates the first particle tracking detector and the third particle tracking detector in a vertical direction along the height of the blast furnace.

In some embodiments, the first particle tracking detector is movable relative to the third particle tracking detector such that the gap between the first particle tracking detector and the third particle tracking detector is adjustable. In some embodiments, the first particle tracking detector, the second particle tracking detector, and at least one additional particle tracking detector are located around a perimeter of the blast furnace, the at least one additional particle tracking detector are movably coupled to the mechanical support structure, and at least some portion of the height of the blast furnace overlaps with heights of the first particle tracking detector, the second particle tracking detector, and the at least one additional particle tracking detector. In some embodiments, the first particle tracking detector, the second particle tracking detector, and the at least one additional particle tracking detector form a geometric pattern around the blast furnace. In some embodiments, each of the first particle tracking detector and the second particle tracking detector are enclosed in a housing that has an air conditioning equipment configured to control a temperature and a humidity in the housing.

In some embodiments, the first particle tracking detector and the second particle tracking detector are located adjacent to fans or air conditioning equipment that are configured to blow air on the first particle tracking detector and the second particle tracking detector. In some embodiments, the first particle tracking detector and the second particle tracking detector are located at a pre-determined distance away from an outer perimeter of the blast furnace. In some embodiments, the particle measurement apparatus includes the processor and a memory with instructions stored therein, wherein the instructions when executed by the processor cause the processor to produce the image based on processing information associated with the received electrical signals. In some embodiments, the instructions when executed by the processor cause the processor to produce the image that comprises an estimate of a spatial map of atomic number and density of the volume of interest.

In some embodiments, the instructions when executed by the processor cause the processor to produce a three-dimensional image of contents inside the blast furnace that includes a cohesion zone where metallic objects melt in the blast furnace or a deadman zone where coke is stagnant in the blast furnace. In some embodiments, the instructions when executed by the processor cause the processor to produce an indication of a presence of cracks or seams in a hearth in the blast furnace in the image. In some embodiments, the instructions when executed by the processor cause the processor to produce an indication of a presence of cracks in an outer wall of the blast furnace in the image. In some embodiments, the instructions when executed by the processor cause the processor to produce a sub-volume in the image, the sub-volume is associated with a pre-determined region within the blast furnace, the pre-determined region is associated with a first imaging accuracy, and a time to develop the sub-volume for the image is longer than that for another sub-volume associated with another region within the blast furnace associated with a second imaging accuracy that is less than the first imaging accuracy. In some embodiments, the particle measurement apparatus includes the processor and a memory with instructions stored therein, wherein the instructions when executed by the processor cause the processor to send instructions to one or more motors associated with the mechanical support structure, wherein the instructions cause the first particle tracking detector and the second particle tracking detector to move up or down and to move clockwise or counterclockwise.

DETAILED DESCRIPTION

FIG. 1 shows an example of a blast furnace. The combustion process within the blast furnace 100 and the furnace structure can be monitored to monitor the shape and location of the cohesive zone (or cohesion zone) where iron ore begin to soften and melt; shape and location of the deadman zone where coke can be stagnant; determine the location and shape of scabs on the inner walls of the blast furnace; determine the location and shape of air pockets; and measure the internal structure of the refractory materials and hearth (e.g. thickness, cracking, etc.). Currently, to some extent, such monitoring can be accomplished by high temperature cameras and infrared (IR) cameras. However, these methods fail to provide a complete picture of the internal structure of the furnace, refractory materials, and hearth, which is a long-standing problem with current blast-furnace imaging technology.

In FIG. 1, the shaft 102 can be full with alternating layers of coke, ore, and limestone. A slag is formed that consists of the limestone flux, ash from the coke, and substances formed by the reaction of impurities in the ore with the flux; it floats in a molten state on the top of the molten iron. Because this process occurs inside the furnace 100, the thickness and location of the layers and iron cannot be determined by conventional methods. Moreover, as the process continues over time, scabs and other deformities are created in the shaft 102 which cannot be easily detected nor can the general structural integrity of the furnace, hearth, and refractory materials be assessed. Therefore, the technology described in this patent document can enable imaging of the internal layers and/or structure of the blast furnace 100.

The disclosed embodiments describe apparatuses, systems, and methods that can provide imaging of an industrial equipment such as a blast furnace using charged particles (also known as cosmic-ray particles or high energy charged particles). The disclosed charged particle detectors and associated mechanical support structures can use charged particles that are components of cosmic-rays as a probe to enable inspection of the blast furnace and provide three-dimensional (3D) mapping of various materials. For example, the disclosed technology can, based on the charged particles traversing the volume of interest, generate a 3D image of the interior content of the blast furnace that can include contrasting atomic number and/or density (e.g. coke, iron ore, molten iron, air pockets, the cohesion zone, the deadman zone, etc.), the thickness of the refractory and the hearth, an indication of the presence of any cracks or seams in the refractory and hearth, and/or an indication of the presence of any cracks in the outer wall of the blast furnace. Thus, the example embodiments described in this patent document can provide a potential solution to the long-standing problem in blast furnace imaging technology. While the system design and implementation are optimized for imaging blast furnaces in some embodiments, it can be used to image other types of objects as well.

The usage of charged particles has several advantages. One technical benefit of the disclosed technology is that it does not generate artificial radiation (e.g., X-Ray) using instead naturally occurring high energy charged particles that are produced by cosmic-ray flux as a probe to image the volume of interest. At least this technical benefit makes the disclosed apparatus safe for any humans, other living organisms and material objects.

The disclosed system makes use of the information provided by the interaction of high energy charged particles with sensitive detectors generating electrical signals as a reaction to interaction of charged particles with the material of the sensitive detector. High energy charged particles that are used by the system disclosed here can be known also as secondary cosmic rays. These particles are created in the interactions of primary cosmic rays in atmosphere. Two components of secondary cosmic rays at sea level are electrons and muons. Other charged particles present in the secondary cosmic rays in much smaller quantities are protons, ions, charged mesons, charged heavy baryons and tauons. All of these particles can produce electrical signals if they interact with material of sensitive detectors. However, because of their small numbers and relatively low penetrating ability these particles can be ignored during the development and operation of the disclosed system.

High-energy electrons can generate tracks in sensitive detectors similar to tracks produced by muons, however, because of their relatively low penetrating capability the majority of electrons will be absorbed with only the most energetic able to penetrate heavily shielded dense objects of inspection such as a blast furnace. Even lower energy muons are likely going to be attenuated given the very high density and average atomic number these particles will encounter inside a blast furnace. As a result, the attenuation portion of the reconstruction will become much more important relative to lower density applications such as truck and cargo scanning.

Positively and negatively charged muons produced in the interactions of primary cosmic rays in atmosphere provide a sensitive probe to detect and image various materials, including, but not limited to, the contents in a blast furnace. Signals produced in sensitive detectors by the interaction of these muons with material of the sensitive detector is used in the disclosed system for the aforementioned goals.

As a charged particle travels through matter, it loses energy predominately by interaction with the atomic electrons within the material. This energy loss is approximately proportional simply to the effective thickness of electron cloud traversed through the material. Because the charge of these atomic electrons is balanced by an equal number of protons in the atomic nuclei, and because in most cases the number of protons in an atomic nucleus is approximately equal to the number of neutrons, we can say that the thickness of electron cloud traversed is roughly proportional to the mass density of material traversed. Hydrogen atoms are the exception to this, as they do not have a neutron in the nucleus. They will therefore have twice the number of electrons per unit mass.

Detecting and measuring the charged particles as they pass through an object of interest has many applications. In one example application, charged particle detection technology as described in this patent document can be used to inspect a blast furnace. Measurements of the scattering angles of cosmic ray muons which pass through the blast furnace can be used to measure the layers of material in the blast furnace and determine if there are any anomalies in the furnace itself.

Figure 2:
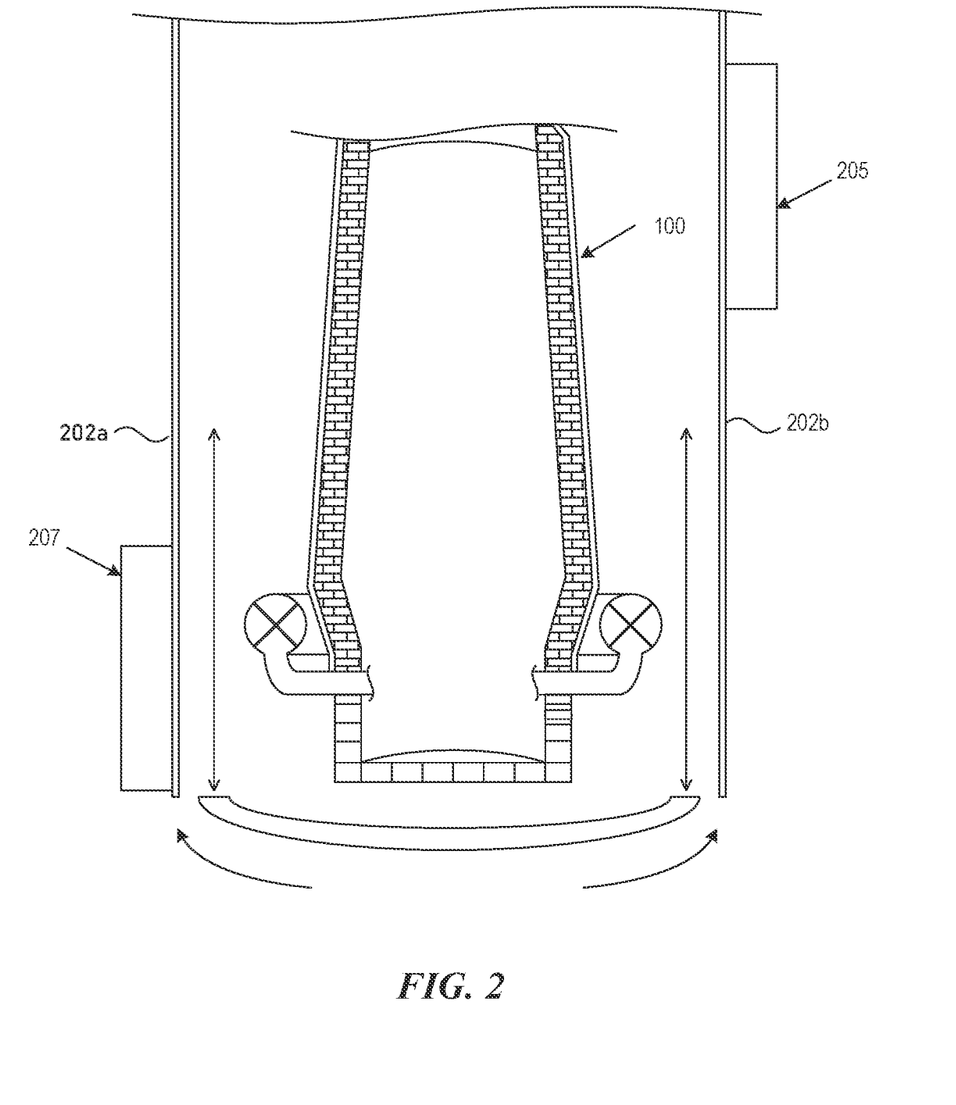
FIG. 2 shows an example system to facilitate inspection of a blast furnace.
Figure 3:
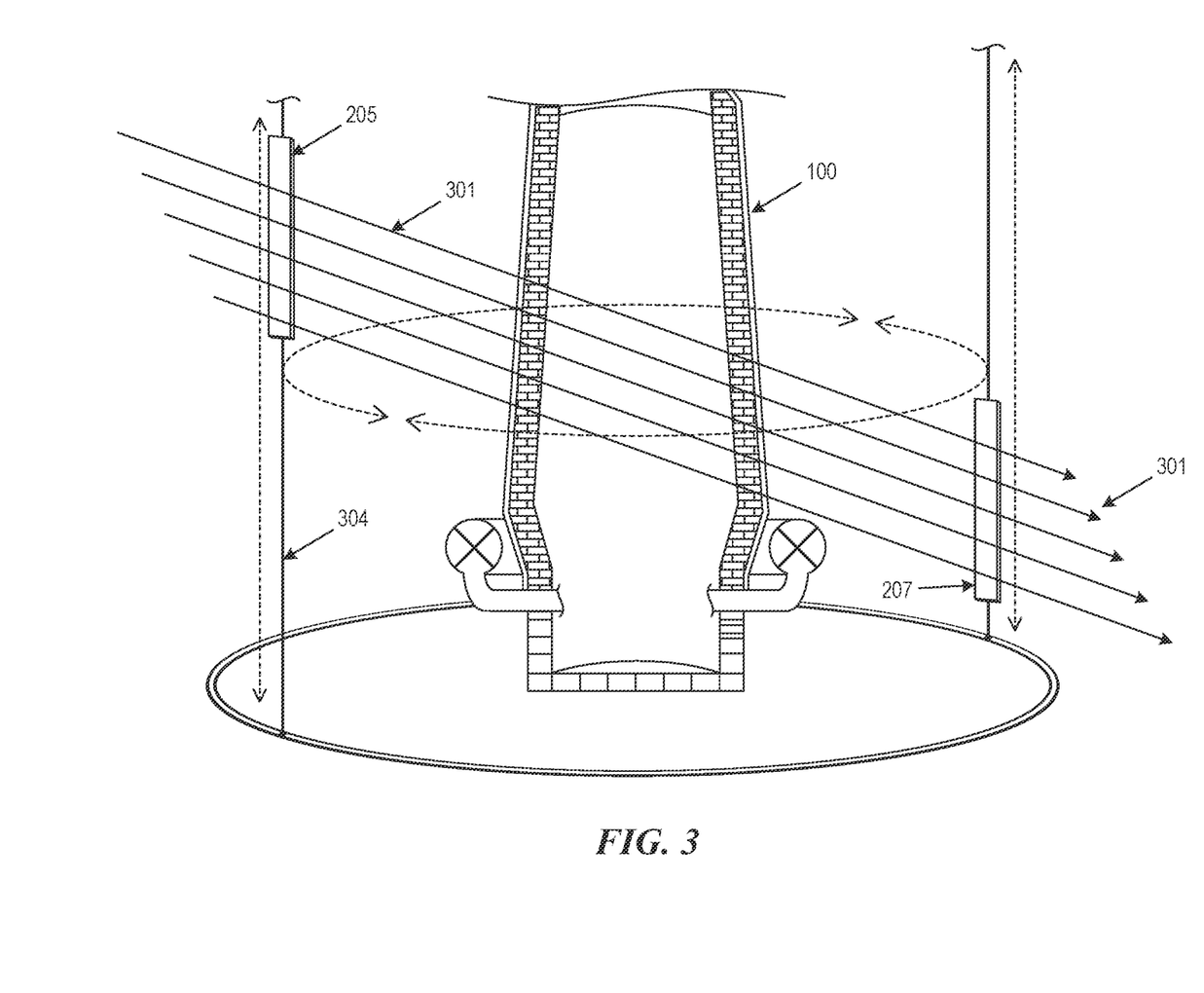
FIG. 3 shows example mechanical support structures located around an object of inspection, where the mechanical support structures include detectors (also known as sensitive units or supermodules).
Figure 4:
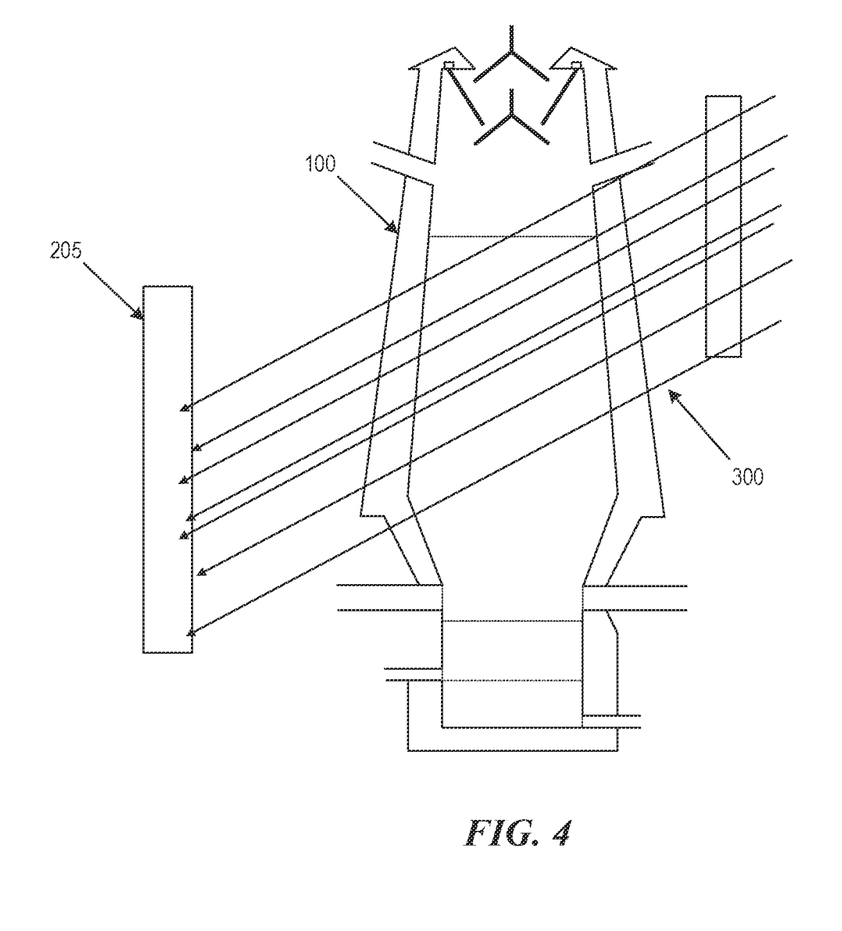
FIG. 4 shows an example placement of detectors in vertical direction as seen from the side of a blast furnace.

FIG. 2 shows an example system to facilitate inspection of a blast furnace 100. The example system includes two detectors 205, 207 (also referred to as sensitive units or a supermodule) that can be located on each side (or on opposite sides) of the blast furnace 100. The detectors 205, 207 are coupled to the mobile assemblies 202a, 202b. In an example embodiment, the detectors are approximately square in section, and can include 4-foot long drift tubes. As shown in FIGS. 3 to 4, a first detector 205 can detect incoming charged particles 301 including muons which pass through the first detector 205 through the blast furnace 100 and may pass through a second detector 207 that can detect outgoing charged particle 301. In FIG. 2, two detectors are shown but more detectors can be used and can located in a variety of configurations, such as the detectors 500 located around an object of inspection 100 shown in FIG. 6.

Figure 5:
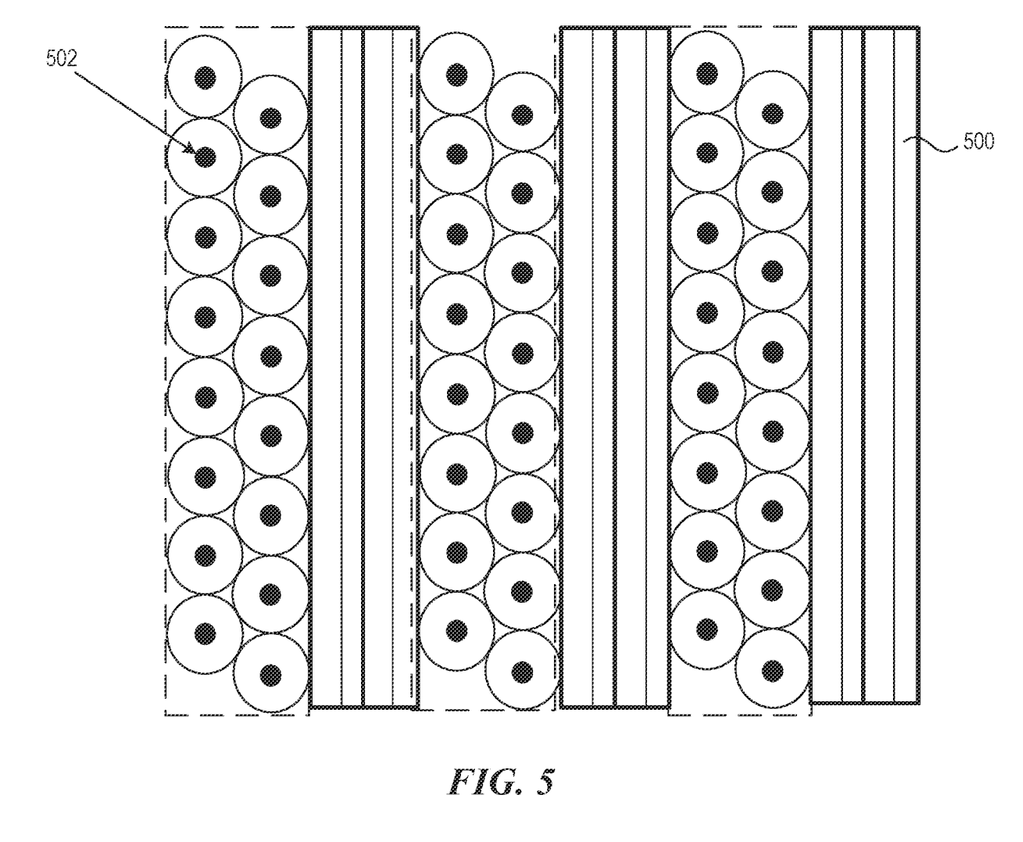
FIG. 5 shows an example design of a detector.

FIG. 5 shows an example detector 500 that includes drift tubes 502. The drift tubes can detect charged particles traversing through the drift tubes. Drift tubes can provide reliable and inexpensive area coverage to measure positions of charged particles interacting with the gas inside them. In some embodiments of the apparatus, the drift tubes are sealed and filled with a non-flammable gas as a safety precaution for operation in the presence of high temperature manufacturing. Other charged particle detector technologies such as scintillating fibers, volume scintillators, resistive plate chambers, or cathode strip chambers may be used instead of or in conjunction with drift tubes as a part of the inspection system.

In some embodiments of a drift tube based system, the drift tubes can be integrated into drift tube modules. The tubes in the module can be glued together or mechanically integrated by other means. The tubes integrated into the module are connected to the same electronic unit. In some embodiments, a single module includes 24 drift tubes arranged in two layers with 12 drift tubes in each layer.

In some embodiments of a drift tube based system, the drift tube modules can be integrated mechanically into detectors. In some embodiments, a detector may include 12 drift tube modules, 6 with drift tubes oriented along X direction and 6 with drift tubes oriented along Y direction, perpendicular to X. In each direction there are 3 layers of the modules separated by the modules oriented in perpendicular direction. Each module can be structurally the same, and all modules can be interchangeable. The modules in the detector may not be permanently fixed together and can be separated apart and reintegrated without breaking any modules or any connections between modules. In some embodiments, a detector may include 12 layers of drift tubes—6 in each direction, with 24 tubes in each layer. The detector in this example may include 288 tubes and 12 electronic units. Electronic units are typically connected together through hubs to reduce the number of external cable connections for the detector. The disclosed and other embodiments can be implemented where the angle between the crisscrossed drift tube modules is not precisely 90 degrees, where there are not precisely 3 layers, or when using one or more detection devices (e.g., drift tubes and scintillating fibers). For example, embodiments where there is between 0-90 degree angular separation between the lengthwise direction of the two crisscrossed arrays of submodules may provide better coverage per unit cost. The detectors can be arranged in any advantageous way such that there are any number of layers aligned in one direction consisting of one or more detection devices, and any number of layers aligned in a different direction consisting of one or more detection devices with angular separation between 0-90 degrees. The disclosed and other embodiments can be implemented where one detection device, such as drift tubes is arranged in a vertical direction, where another detection device, such as volume scintillators, may be arranged around the circumference of the vertical detector. Other charged particle detectors may further include silicon wafer, thin-gap chamber (TGC) and Thick Gas Electron Multiplier (THGEM) detectors.

Referring to FIGS. 2-3, a first particle tracking detector 205 located to receive incoming charged particles 301 that transit through the blast furnace 100. The detectors 205, 207 are enabled to measure a position and direction of the charged particles 301 that transit through the blast furnace, for example, while allowing the charged particles 301 to pass through. The detectors can be placed as close to the blast furnace as possible while minimizing interference with any external structures adjacent to the blast furnace and while maintaining the operating temperature of the detectors 205, 207 within an acceptable pre-determined range. The detectors can be placed close to or far from the blast furnace 100. However, the farther the detectors 205, 207 are from the blast furnace 100, the larger detector surface area will be to image the same internal volume of the blast furnace. Thus, in some embodiments, the surface area of the sides of the detectors 205, 207 facing the blast furnace 100 is based on or is a function of a distance between the detectors 205, 207 and the outer perimeter of the blast furnace 100.

As shown in FIGS. 2-4, a second particle tracking detector 207 can be located at a position lower relative to the first particle tracking detector 205 and on the opposite side of the first particle tracking detector 205 relative to the volume of interest, such as the blast furnace 100 containing molten iron and other material (not shown). The second particle tracking detector 207 is located in such a way as to receive at least some of the outgoing charged particles 301 that transit through the first particle tracking detector 205 and transit through the blast furnace 100 and the material therein and to measure the position and direction of these outgoing charged particles 301 through the second detector 207.

The mounting heights for the detectors on the mechanical support structures can be chosen based on modeling of the incoming cosmic ray muon flux and inspection requirements. The charge particles are further identified within each module based on two indicators of particle tracks. The height of mounting can be adjusted for each detector 205, 207. This height can be optimized for a system and/or for a particular object of inspection. The optimization can be done based on the size of the object of inspection and modeling of the cosmic-ray flux directional distribution relative to the zenith angle.

In FIG. 2, the up and down arrows next to the blast furnace 100 indicate that the detectors 205, 207 can be moved up and down along a height of the blast furnace 100 using motors that are coupled to the detectors 205, 207, where the motors are coupled to a mechanical support structure (shown as 304 in FIG. 3). The mechanical support structure 304 may also include two or more mobile assemblies providing mobility and support for two detector 205, 207, installed in a vertical orientation on top of one another, with a gap between them. For example, one mobile assembly comprising a detector can be located on top of the mechanical support structure and another mobile assembly comprising another detector can be located on a bottom area of the mechanical support structure with a gap between the two mobile assemblies. In some embodiments, a first mechanical support structure assemblies includes a first detectors 205, and a second mechanical support structure can include a second detector 207 as shown in FIG. 3. The term mobile assembly is also referred to as mobile platform. In some embodiments, the detectors 205, 207 may be moved up or down via motors in unison (or at a same time) so that a position of one detector 205 relative to a position of another detector 207 can be the same as the detectors 205, 207 are being moved up or down to different locations along a height of the blast furnace. In some embodiments, a vertical distance between one detector 205 and another detector 207 is pre-determined. In FIG. 2, the arrows pointing left and right indicate that the detectors 205, 207 can be moved around the blast furnace to measure position and direction of charged particles in multiple areas of the blast furnace 100. The mechanical support structure 304 may be coupled to another motor that can allow the mechanical support structure 304 to be rotated or moved clockwise or counterclockwise around the blast furnace 100 (indicate by left and right arrows on the bottom of FIGS. 2-3).

Figure 6:
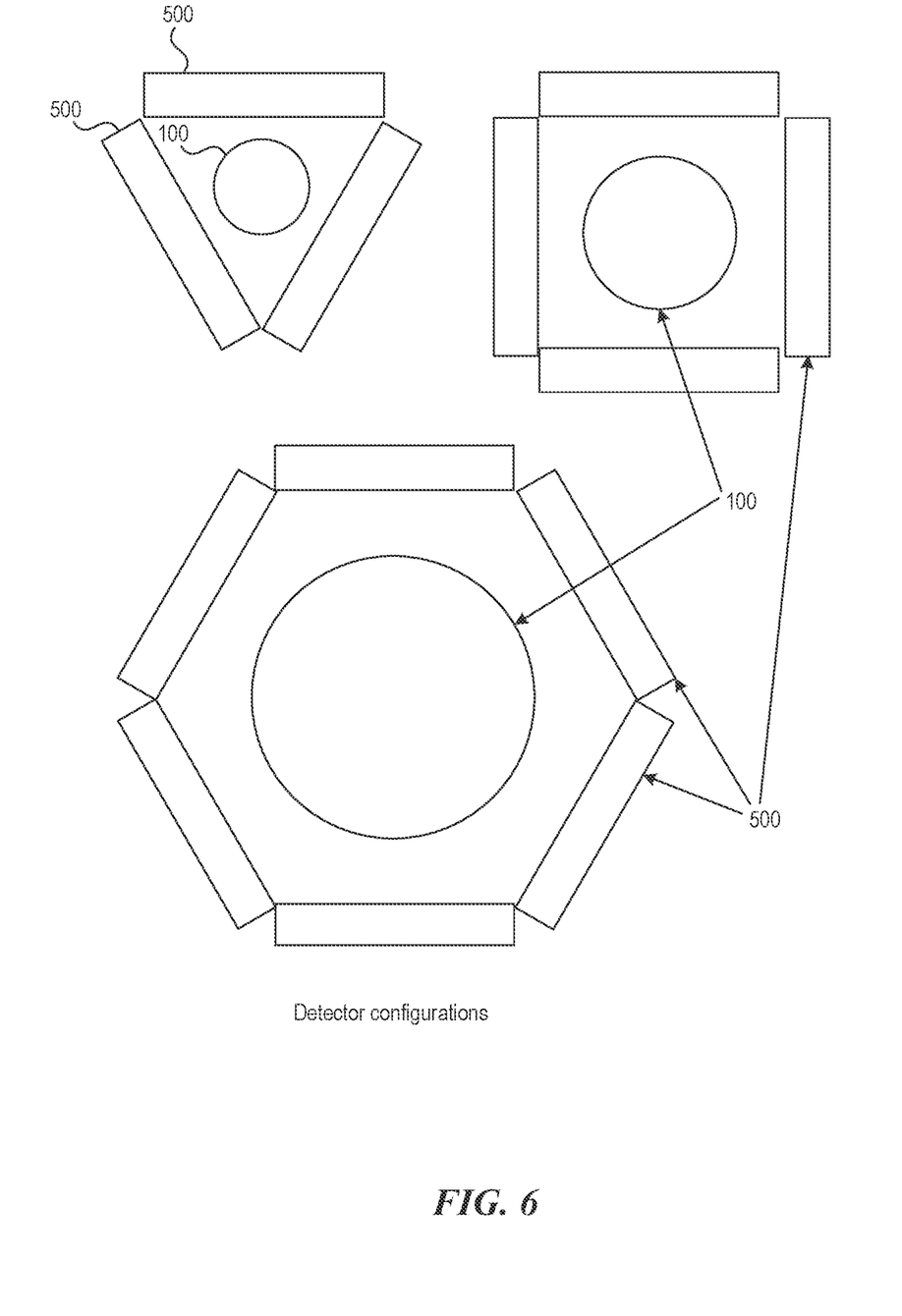
FIG. 6 shows a top-down view of example configurations of detectors located around an object of inspection, such as a blast furnace.

The detectors 205, 207 can be installed on mechanical support structures 304 as shown by one example illustration in FIG. 3 to allow inspection and imaging of the volume of interest. Each mechanical support structure can include two detectors installed vertically, one on top and another on the bottom, and can have a gap separating them in vertical direction. Mechanical support structures can enable detectors to maneuver horizontally and vertically around the blast furnace. In some embodiments, the minimal number of mobile assemblies can be two, which can be installed on opposite sides of the object of inspection. In some embodiments, the mobile assemblies can be installed around the object of inspection in a regular pattern forming regular geometrical figure (e.g., triangle, square, pentagon or hexagon) that allows detectors to form geometrical figure (as seen in top-down view as shown in FIG. 6). The mobile assemblies can be secured in place to avoid further movement during the data collection when charged particles are being detected by at least two detectors.

Other mechanical elements related to mobile assemblies may include rigid metal bars interconnecting mobile assemblies to provide enhanced geometrical rigidity of the system, and/or the mobile assemblies can be further arranged in a regular geometrical pattern around the object of inspection. In an example embodiment, the mobile assemblies can be connected together after placement in the appropriate position with rigid metal bars to enable the rigidity of the system geometry during the data collection. Other mechanical elements further include portable canopy or canopies or plastic enclosures on or around the mobile assemblies and/or detectors to provide protection against weather extremes, such as snow, strong wind and/or direct sunlight. The mounting height of top detector within the mobile assembly is further mechanically adjustable. The size of the gap between two detectors in the same mobile assembly is mechanically adjustable.

Heights of both detectors on a mobile platform can be changed, and size of the gap separating the detectors on one mobile platform can be changed as well. The gap between the detectors can be 4 feet in vertical direction, and whole mobile assembly can be 12 foot tall or more. These numbers associated with the dimensions or gaps are examples and can be varied for different embodiments. The detector can allow inspection and imaging of the volume of interest 100 without moving objects of inspection (e.g., blast furnace) within the volume of interest.

The detectors 205, 207 may be repositioned around the blast furnace 100. As shown in FIG. 3, a mechanical support structure 304 can keep both the first particle tracking detector 205 and the second particle tracking detector 207 in positions where these units can function. Additionally, as indicated by the up and down arrows in FIG. 2 and by the left and right arrows in FIGS. 2-3, the detectors 205, 207 may be positioned (or moved) up and down on mechanical support structure 304 and/or can be rotated around the blast surface 100 to enable different areas of the blast furnace 100 to be inspected.

The system disclosed in this patent document can include different number of mobile assemblies and associated detectors depending on the size of the inspected object 100 (e.g., blast furnace) and requirements of the inspection, as shown for the different detector configurations in FIG. 6. In some embodiments, the minimum number of mobile assemblies is two, which can be installed on the opposite sides of the object of inspection.

In FIGS. 2-4, the blast furnace 100 can generate an enormous amount of heat. The two or more detectors 205, 207 may include drift tubes and associated electronics and cabling that may require environmental control to keep the temperatures of the two or more detectors 205, 207 within an acceptable range to facilitate proper operation of system components. Depending on the specific configuration of the structure adjacent to the blast furnace, and general environmental factors such as ambient temperature ranges and humidity, the specific environmental controls to keep the operating temperature of the two or more detectors 205, 207 within an acceptable range can be tailored for each site where the blast furnace is located. In some embodiments, the specific environmental controls for the two or more detectors 205, 207 may include fully enclosing each detector in an environmental containment (e.g., in a housing) where the temperature and humidity are directly controlled with air conditioning equipment coupled to the containment. In some other embodiments, the specific environmental controls for the two or more detectors 205, 207 may include employing passive cooling techniques such as detectors with an open design with portable air conditioning units located adjacent to and blowing cool air the detectors. In some embodiments, the specific environmental controls for the two or more detectors 205, 207 may include using ventilation fans coupled to the detectors to cool the detectors. In some embodiments, the detectors 205, 207 may not need environmental controls at least because the two or more detectors 205, 207 may be positioned at some safe distance (e.g., a pre-determined distance) away from the outer perimeter of the blast furnace 100 so that heat radiating from the blast furnace 100 does not damage the two or more detectors 205, 207 or does not cause the temperature of two or more detectors 205, 207 to exceed an upper pre-determined operating temperature limit.

A computer comprising processor(s) (shown as 704 in FIG. 7) may be communicably coupled to both the first particle tracking detector 205 and the second particle tracking detector 207 so that the scanning module (shown as 710 in FIG. 7) can measure the individual charged particle tracks based on the charged particles entering the first particle tracking detector 205 and exiting the second particle tracking detector 207 to yield an estimate of a spatial map of an atomic number and density of the volume of interest in the blast furnace. The scanning module can generate the estimate of the spatial map based on the electrical signals related to the detection of the charged particles that are sent by the detectors 205, 207. A first indicator is based on the timing coincidence of the signals within the coincidence window. The coincidence window size can be further set independently for each module in the firmware of each relevant electronic unit. The coincidence window size can be further optimized based on the timing properties of the sensitive detectors in the module and ambient radiation field at the position of the module placement. A second indicator is further based on the positions of the selected sensitive detectors. The second indicator can be further optimized based on the position of selected sensitive detectors within the module and relative position of the module relative to the object of inspection.

Figure 7:
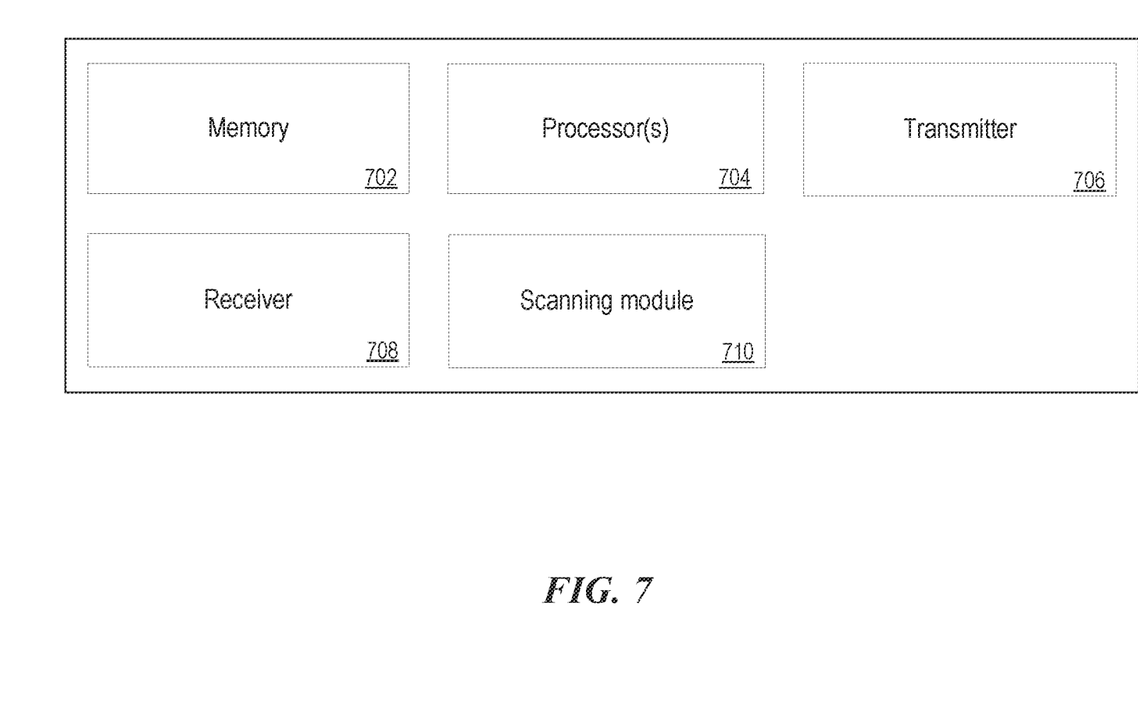
FIG. 7 shows a block diagram of a computer communicably coupled to two or more detectors.

In some embodiments, the scanning module 710 can, based on processing the electrical signals associated with the charged particles entering and/or exiting the detectors 205, 207 (e.g., position and direction of the charged particles), generate a 3D image of the interior content of the blast furnace that can include contrasting atomic number and density (e.g. coke, iron ore, molten iron, air pockets, the cohesion zone, the deadman zone, etc.); the thickness of the refractory and the hearth; an indication of the presence of any cracks or seams in the refractory and hearth; and/or an indication of the presence of any cracks in the outer wall of the blast furnace. The detectors 205, 207 can continuously measure the incoming and outgoing high energy charged particles. The reconstruction algorithms operated by the scanning module 710 can integrate the signals from the detectors 205, 207 over a configurable time period to provide an image, which may be a 3D image of the contents of the blast furnace. Regardless of the location and number of the detectors, the system can provide an image of a portion of the blast area or the entire blast furnace within the limiting rays between all detector pairs at any time. In some embodiments, the two or more detectors 205, 207 can be designed to have a size that enables the two or more detector 205, 207 to measure the incoming and outgoing high energy charged particles through most of or the entire blast furnace.

Different regions within the blast furnace may require different time integration periods to develop an image that is useful for that specific region. For example, some regions of the blast furnace (e.g., the top region of the blast furnace) may require less accuracy or be more dynamic and require shorter integration times for a meaningful analysis. Other regions of the blast furnace (e.g., the cohesion zone, the deadman zone, outer surface of the blast furnace) may require higher accuracy or be more static, allowing for a longer integration time. In this context, the scanning module 710 of the computer communicably coupled to the detectors 205, 207 can produce or generate sub-volumes of the reconstruction image for different locations at different integration times to meet these unique needs. The scanning module 710 can produce sub-volumes by analyzing the incoming and outgoing high energy charged particles through the regions that require higher accuracy, where the locations of such regions may be pre-defined. In some embodiments, the entire blast furnace image can be available at any time at least because the detectors 205, 207 can always continuously measure the incoming and outgoing high energy charged particles.

A method of data processing performed by the scanning module 710 may further include filtering out signals not identified as belonging to charged particle tracks. In some embodiments, the scanning module 710 can use a filter on charged particle tracks to optimize resolution in a particular direction or in a desired or particular region.

In some embodiments, the scanning module 710 can send instructions to one or more motors associated with the mechanical support structure to cause the one or more mobile assemblies to move the detectors up or down and/or to cause the mechanical support structure to move the detectors in a clockwise or counterclockwise direction around the blast furnace 100.

As shown in FIG. 6, a number of detectors and the associated number of mobile assemblies in the system can be chosen based on the size of the object of inspection and other inspection requirements. The mobile assemblies can be positioned or located around the object of inspection 100 before the start of data collection. Relative position of the detectors to each other can be determined by the process of mechanical survey to provide a gross adjustment and followed by geometry calibration based on the measurement of charged particle tracks to provide a fine adjustment. The geometry calibration may be based on collected measurements of incoming and outgoing particle tracks.

In drift tube based detector embodiments, improved measurement of the particle tracks can be achieved with the calibration of time-to-radius conversion function based on the collected data. The calibration is performed iteratively during the data collection process. Thus, an iterative calibration of time-to-radius response function for each drift tube detector in the system may be performed. The calibration is performed during the data collection process and its results are used for imaging of the object of inspection. In other embodiments, support subsystems for reliable operation of subsystems described above may be included.

FIG. 7 shows a block diagram of a computer communicably coupled to two or more detectors. The computer comprises a memory 702 and one or more processors 704. The memory 702 includes processor-executable instructions stored thereon. The processor-executable instructions upon execution by the one or more processors 704 configure the computer according to perform operations related to the scanning module 710 as explained in this patent document. In some embodiments, the computer may be one or more computers or one or more servers. The computer may include a transmitter 706 to send information, such as a 3D image to another computer. The computer may include a receiver 708 that receives measurement information from the two or more detectors, where the measurement information indicates the high energy charged particles detected by the two or more detectors.

Figure 8:
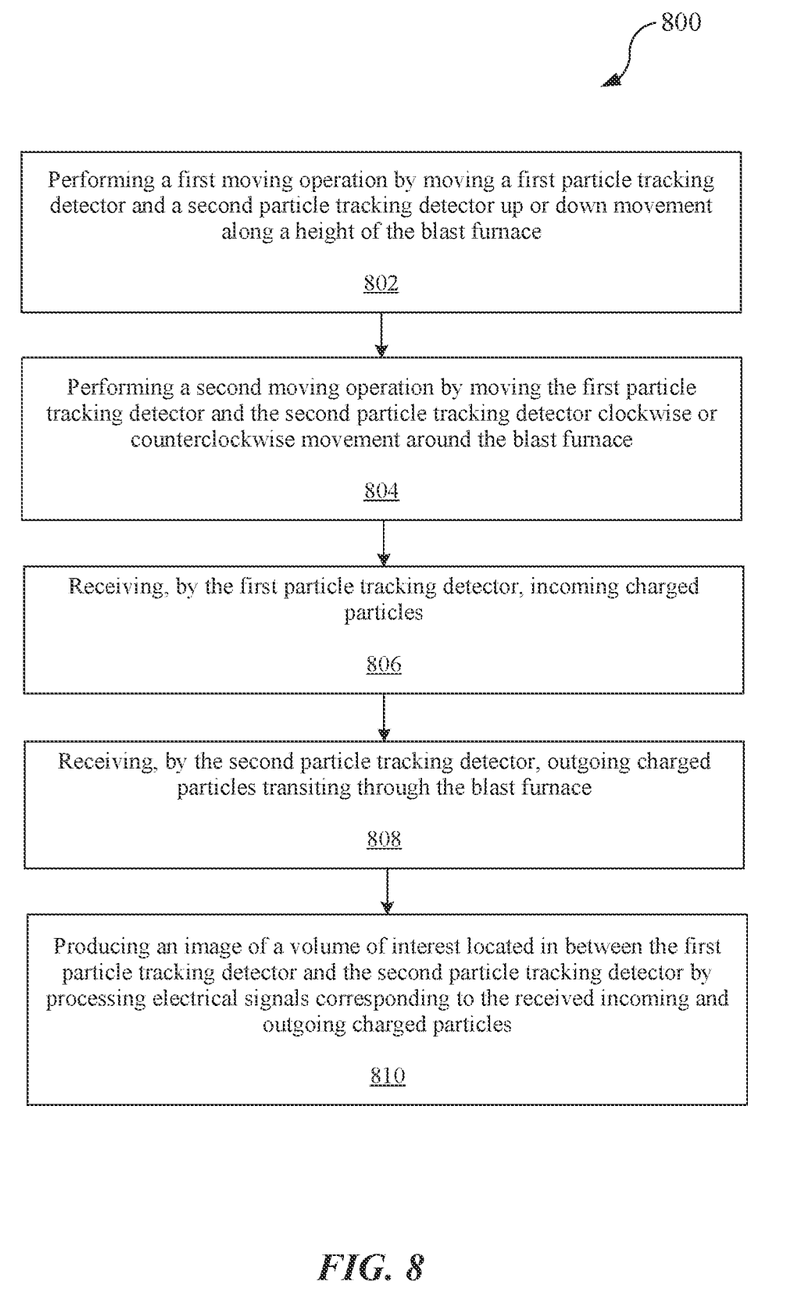
FIG. 8 is a flowchart to operate particle tracking detectors around an object of inspection, such as a blast furnace.

FIG. 8 is a flowchart to operate particle tracking detectors around an object of inspection, such as a blast furnace. Operation 802 includes performing a first moving operation by moving a first particle tracking detector and a second particle tracking detector up or down movement along a height of the blast furnace, where a location of the first particle tracking detector next to a side of the blast furnace is higher than that of the second particle tracking detector. Operation 804 includes performing a second moving operation by moving the first particle tracking detector and the second particle tracking detector clockwise or counterclockwise movement around the blast furnace.

After operations 802 and 804 are performed, operations 806 to 810 are performed. Operation 806 includes receiving, by the first particle tracking detector, incoming charged particles. Operation 808 includes receiving, by the second particle tracking detector, outgoing charged particles transiting through the blast furnace. Operation 810 includes producing an image of a volume of interest located in between the first particle tracking detector and the second particle tracking detector by processing electrical signals corresponding to the received incoming and outgoing charged particles. In some embodiments, the operations described in FIG. 8 can be performed by or caused to be performed by the scanning module (shown as 710 in FIG. 7). For example, the scanning module can send instructions to cause the first particle tracking detector and the second particle tracking detector to move (e.g., up/down and/or clockwise/counterclockwise); the scanning module can receive electrical signals indicating that the first and/or second particle tracking detectors have respectively detected incoming and outgoing charged particles; and/or the scanning module can generate or produce an image of the volume of interest based on the electrical signals corresponding to the received incoming and outgoing charged particles.

In some embodiments, the method comprises performing the up or down movement of the first particle tracking detector and the second particle tracking detector at a same time or in unison; and performing the up or down movement of the first particle tracking detector and the second particle tracking detector while keeping a position of the first particle tracking detector relative to that of the second particle tracking detector the same.

In some embodiments, a particle measurement apparatus comprises a first particle tracking detector located adjacent to a blast furnace to receive incoming charged particles, the first particle tracking detector configured to measure position and direction of the incoming charged particles received thereon; and a second particle tracking detector located adjacent to the blast furnace to receive outgoing charged particles after transiting through the blast furnace and to measure position and direction of the outgoing charged particles received thereon; where the first particle tracking detector and the second particle tracking detector are movably coupled to a mechanical support structure, where the first particle tracking detector and the second particle tracking detector are movable up or down along a height of the blast furnace, where the first particle tracking detector and the second particle tracking detector are movable clockwise or counterclockwise around the blast furnace, where a location of the first particle tracking detector next to a side of the blast furnace is higher than that of the second particle tracking detector, and where the first particle tracking detector and the second particle tracking detector are respectively configured to produce electrical signals corresponding to the received incoming and outgoing charged particles, and wherein the electrical signals, when received by and processed by a processor, enable construction of an image of a volume of interest located in between the first particle tracking detector and the second particle tracking detector.

In some embodiments, the first particle tracking detector and the second particle tracking detector respectively include a first side and a second side that faces the blast furnace, and a surface area of the first side or the second side is selected based on a distance between an outer perimeter of the blast furnace and the first particle tracking detector or the second particle tracking detector. In some embodiments, the first particle tracking detector and the second particle tracking detector are movable up or down along the height of the blast furnace at a same time or in unison. In some embodiments, the first particle tracking detector and the second particle tracking detector are movable up or down along the height of the blast furnace while a position of the first particle tracking detector relative to that of the second particle tracking detector is kept the same. In some embodiments, a first mobile assembly comprising the first particle tracking detector and a third particle tracking detector are located adjacent to the blast furnace, and wherein a gap separates the first particle tracking detector and the third particle tracking detector in a vertical direction along the height of the blast furnace.

In some embodiments, the first particle tracking detector is movable relative to the third particle tracking detector such that the gap between the first particle tracking detector and the third particle tracking detector is adjustable. In some embodiments, the first particle tracking detector, the second particle tracking detector, and at least one additional particle tracking detector are located around a perimeter of the blast furnace, the at least one additional particle tracking detector are movably coupled to the mechanical support structure, and at least some portion of the height of the blast furnace overlaps with heights of the first particle tracking detector, the second particle tracking detector, and the at least one additional particle tracking detector. In some embodiments, the first particle tracking detector, the second particle tracking detector, and the at least one additional particle tracking detector form a geometric pattern around the blast furnace. In some embodiments, each of the first particle tracking detector and the second particle tracking detector are enclosed in a housing that has an air conditioning equipment configured to control a temperature and a humidity in the housing.

In some embodiments, the first particle tracking detector and the second particle tracking detector are located adjacent to fans or air conditioning equipment that are configured to blow air on the first particle tracking detector and the second particle tracking detector. In some embodiments, the first particle tracking detector and the second particle tracking detector are located at a pre-determined distance away from an outer perimeter of the blast furnace. In some embodiments, the particle measurement apparatus includes the processor and a memory with instructions stored therein, wherein the instructions when executed by the processor cause the processor to produce the image based on processing information associated with the received electrical signals. In some embodiments, the instructions when executed by the processor cause the processor to produce the image that comprises an estimate of a spatial map of atomic number and density of the volume of interest.

In some embodiments, the instructions when executed by the processor cause the processor to produce a three-dimensional image of contents inside the blast furnace that includes a cohesion zone where metallic objects melt in the blast furnace or a deadman zone where coke is stagnant in the blast furnace. In some embodiments, the instructions when executed by the processor cause the processor to produce an indication of a presence of cracks or seams in a hearth in the blast furnace in the image. In some embodiments, the instructions when executed by the processor cause the processor to produce an indication of a presence of cracks in an outer wall of the blast furnace in the image. In some embodiments, the instructions when executed by the processor cause the processor to produce a sub-volume in the image, the sub-volume is associated with a pre-determined region within the blast furnace, the pre-determined region is associated with a first imaging accuracy, and a time to develop the sub-volume for the image is longer than that for another sub-volume associated with another region within the blast furnace associated with a second imaging accuracy that is less than the first imaging accuracy. In some embodiments, the particle measurement apparatus includes the processor and a memory with instructions stored therein, wherein the instructions when executed by the processor cause the processor to send instructions to one or more motors associated with the mechanical support structure, wherein the instructions cause the first particle tracking detector and the second particle tracking detector to move up or down and to move clockwise or counterclockwise.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A particle measurement system, comprising:
a blast furnace;
a first particle tracking detector located adjacent to the blast furnace to receive incoming charged particles, the first particle tracking detector configured to measure position and direction of the incoming charged particles received thereon; and
a second particle tracking detector located adjacent to the blast furnace to receive outgoing charged particles after transiting through the blast furnace and to measure position and direction of the outgoing charged particles received thereon;
wherein the first particle tracking detector and the second particle tracking detector are movably coupled to a mechanical support structure,
wherein the first particle tracking detector and the second particle tracking detector are movable up or down along a height of the blast furnace,
wherein the first particle tracking detector and the second particle tracking detector are movable clockwise or counterclockwise around the blast furnace,
wherein a location of the first particle tracking detector next to a side of the blast furnace is higher than that of the second particle tracking detector,
wherein the first particle tracking detector and the second particle tracking detector are respectively configured to produce electrical signals corresponding to the received incoming and outgoing charged particles, and wherein the electrical signals, when received by and processed by a processor, enable construction of an image of a volume of interest located in between the first particle tracking detector and the second particle tracking detector,
wherein the particle measurement system includes the processor and a memory with instructions stored therein, wherein the instructions when executed by the processor cause the processor to:
produce the image based on processing information associated with the received electrical signals, and
produce a three-dimensional image of contents inside the blast furnace that includes a cohesion zone where metallic objects melt in the blast furnace or a deadman zone where coke is stagnant in the blast furnace,
wherein a first mobile assembly comprising the first particle tracking detector and a third particle tracking detector are located adjacent to the blast furnace,
wherein a gap separates the first particle tracking detector and the third particle tracking detector in a vertical direction along the height of the blast furnace, and
wherein the first particle tracking detector is movable relative to the third particle tracking detector such that the gap between the first particle tracking detector and the third particle tracking detector is adjustable.

2. The particle measurement system of claim 1, wherein the first particle tracking detector and the second particle tracking detector respectively include a first side and a second side that faces the blast furnace, and wherein a surface area of the first side or the second side is selected based on a distance between an outer perimeter of the blast furnace and the first particle tracking detector or the second particle tracking detector.

3. The particle measurement system of claim 1, wherein the first particle tracking detector and the second particle tracking detector are movable up or down along the height of the blast furnace at a same time.

4. The particle measurement system of claim 1, wherein the first particle tracking detector and the second particle tracking detector are movable up or down along the height of the blast furnace while a position of the first particle tracking detector relative to that of the second particle tracking detector is kept the same.

5. The particle measurement system of claim 1,
wherein the first particle tracking detector, the second particle tracking detector, and at least one additional particle tracking detector are located around a perimeter of the blast furnace,
wherein the at least one additional particle tracking detector are movably coupled to the mechanical support structure, and
wherein at least some portion of the height of the blast furnace overlaps with heights of the first particle tracking detector, the second particle tracking detector, and the at least one additional particle tracking detector.

6. The particle measurement system of claim 5, wherein the first particle tracking detector, the second particle tracking detector, and the at least one additional particle tracking detector form a geometric pattern around the blast furnace.

7. The particle measurement system of claim 1, wherein each of the first particle tracking detector and the second particle tracking detector are enclosed in a housing that has an air conditioning equipment configured to control a temperature and a humidity in the housing.

8. The particle measurement system of claim 1, wherein the first particle tracking detector and the second particle tracking detector are located adjacent to fans or air conditioning equipment that are configured to blow air on the first particle tracking detector and the second particle tracking detector.

9. The particle measurement system of claim 1, wherein the first particle tracking detector and the second particle tracking detector are located at a pre-determined distance away from an outer perimeter of the blast furnace.

10. The particle measurement system of claim 1, wherein the instructions when executed by the processor cause the processor to produce the image that comprises an estimate of a spatial map of atomic number and density of the volume of interest.

11. The particle measurement apparatus of claim 1, wherein the instructions when executed by the processor cause the processor to produce an indication of a presence of cracks or seams in a hearth in the blast furnace in the image.

12. The particle measurement system of claim 1, wherein the instructions when executed by the processor cause the processor to produce an indication of a presence of cracks in an outer wall of the blast furnace in the image.

13. The particle measurement system of claim 1,
wherein the instructions when executed by the processor cause the processor to produce a sub-volume in the image,
wherein the sub-volume is associated with a pre-determined region within the blast furnace,
wherein the pre-determined region is associated with a first imaging accuracy, and
wherein a time to develop the sub-volume for the image is longer than that for another sub-volume associated with another region within the blast furnace associated with a second imaging accuracy that is less than the first imaging accuracy.

14. The particle measurement system of claim 1, wherein the instructions when executed by the processor cause the processor to send instructions to one or more motors associated with the mechanical support structure, wherein the instructions cause the first particle tracking detector and the second particle tracking detector to move up or down and to move clockwise or counterclockwise.

15. A method of imaging a blast furnace, comprising:
performing a first moving operation by moving a first particle tracking detector and a second particle tracking detector up or down movement along a height of the blast furnace, wherein a location of the first particle tracking detector next to a side of the blast furnace is higher than that of the second particle tracking detector,
wherein a first mobile assembly comprising the first particle tracking detector and a third particle tracking detector are located adjacent to the blast furnace,
wherein a gap separates the first particle tracking detector and the third particle tracking detector in a vertical direction along the height of the blast furnace, and
wherein the first particle tracking detector is movable relative to the third particle tracking detector such that the gap between the first particle tracking detector and the third particle tracking detector is adjustable;
performing a second moving operation by moving the first particle tracking detector and the second particle tracking detector clockwise or counterclockwise movement around the blast furnace; and
after the first moving operation and after the second moving operation is performed:
receiving, by the first particle tracking detector, incoming charged particles;
receiving, by the second particle tracking detector, outgoing charged particles transiting through the blast furnace;
producing an image of a volume of interest located in between the first particle tracking detector and the second particle tracking detector by processing electrical signals corresponding to the received incoming and outgoing charged particles; and
producing a three-dimensional image of contents inside the blast furnace that includes a cohesion zone where metallic objects melt in the blast furnace or a deadman zone where coke is stagnant in the blast furnace.

16. The method of claim 15, comprising performing the up or down movement of the first particle tracking detector and the second particle tracking detector at a same time; and performing the up or down movement of the first particle tracking detector and the second particle tracking detector while keeping a position of the first particle tracking detector relative to that of the second particle tracking detector the same.

17. The method of claim 15, wherein the image comprises an estimate of a spatial map of atomic number and density of the volume of interest.

18. The method of claim 15, wherein an indication of a presence of cracks or seams in a hearth in the blast furnace is produced in the image.

19. The method of claim 15, wherein an indication of a presence of cracks in an outer wall of the blast furnace is produced in the image.

20. The method of claim 15,
wherein a sub-volume is produced in the image,
wherein the sub-volume is associated with a pre-determined region within the blast furnace,
wherein the pre-determined region is associated with a first imaging accuracy, and
wherein a time to develop the sub-volume for the image is longer than that for another sub-volume associated with another region within the blast furnace associated with a second imaging accuracy that is less than the first imaging accuracy.

\* \* \* \* \*